(12) United States Patent
Pujar et al.

(10) Patent No.: US 12,485,575 B2
(45) Date of Patent: Dec. 2, 2025

(54) FORMING A PREFORM INTO A SHAPED BODY

(71) Applicant: Rohr, Inc., Chula Vista, CA (US)

(72) Inventors: Vijay V. Pujar, San Diego, CA (US); Katherine E. Waugh, Easton, CT (US); Christopher C. Koroly, Spring Valley, CA (US)

(73) Assignee: ROHR, INC., Chula Vista, CA (US)

( * ) Notice: Subject to any disclaimer, the term of this patent is extended or adjusted under 35 U.S.C. 154(b) by 12 days.

(21) Appl. No.: 17/889,164

(22) Filed: Aug. 16, 2022

(65) Prior Publication Data

US 2024/0058988 A1 Feb. 22, 2024

(51) Int. Cl.
B28B 7/00 (2006.01)
B28B 3/00 (2006.01)
B28B 17/00 (2006.01)
B29C 53/04 (2006.01)
B29C 70/54 (2006.01)
B29C 70/56 (2006.01)
C04B 35/83 (2006.01)

(52) U.S. Cl.
CPC .............. *B28B 7/0029* (2013.01); *B28B 3/00* (2013.01); *B28B 17/0009* (2013.01); *B29C 53/04* (2013.01); *B29C 70/541* (2013.01); *B29C 70/56* (2013.01); *C04B 35/83* (2013.01); *C04B 2235/5252* (2013.01)

(58) Field of Classification Search
CPC .... B29C 70/56; B28B 11/003; B28B 17/0009
See application file for complete search history.

(56) References Cited

U.S. PATENT DOCUMENTS

| | | | |
|---|---|---|---|
| 9,399,325 B2 | 7/2016 | Barlag et al. | |
| 9,694,547 B2 | 7/2017 | Göttinger et al. | |
| 2004/0091570 A1* | 5/2004 | Wohlrab | B29C 45/68 425/589 |
| 2008/0283177 A1 | 11/2008 | Glain et al. | |
| 2010/0263789 A1* | 10/2010 | Graber | B29C 70/56 156/228 |
| 2011/0100152 A1* | 5/2011 | Huynh | F41G 1/22 74/504 |
| 2013/0276987 A1* | 10/2013 | Pham | B29C 70/44 156/381 |

(Continued)

FOREIGN PATENT DOCUMENTS

| | | |
|---|---|---|
| CN | 201633212 | 11/2010 |
| CN | 205185349 | 4/2016 |

(Continued)

OTHER PUBLICATIONS

European Patent Office, European Search Report dated Jan. 17, 2024 in Application No. 23188652.4.

*Primary Examiner* — Seyed Masoud Malekzadeh
*Assistant Examiner* — Vipul Malik
(74) *Attorney, Agent, or Firm* — SNELL & WILMER L.L.P.

(57) ABSTRACT

A manufacturing method is provided. A preform is arranged over a surface of an inner mold line. The preform is folded over sides of the inner mold line. An end of the preform is pressed into a grip strip coupled to a side of the inner mold line. The grip strip is translated in a first direction to tension the preform into a shaped body.

7 Claims, 14 Drawing Sheets

(56) References Cited

U.S. PATENT DOCUMENTS

2015/0183171 A1* 7/2015 Kline ...................... B29C 70/56
                                                        156/163
2021/0101350 A1* 4/2021 Aitharaju .............. B29C 70/467
2021/0339483 A1* 11/2021 Werntges .............. B29C 70/541
2022/0212423 A1* 7/2022 Sundquist ............. B29C 70/544

FOREIGN PATENT DOCUMENTS

| EP | 2581203 A1 * | 4/2013 | ............. B29C 53/04 |
| EP | 2581203 | 12/2013 | |
| JP | 2014051077 A * | 3/2014 | |

* cited by examiner

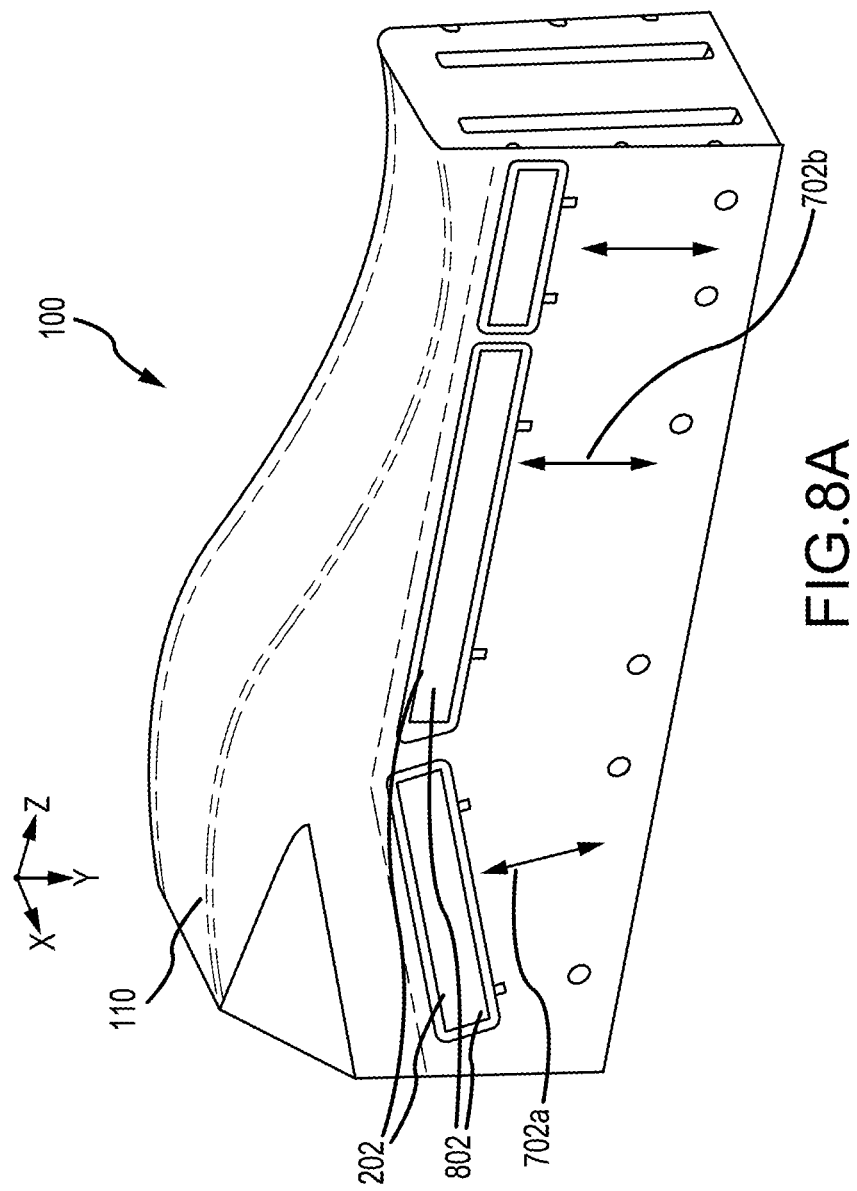

FORMING A PREFORM INTO A SHAPED BODY

FIELD

The present disclosure relates generally to forming a preform into a shaped body.

BACKGROUND

Shaped composite bodies are utilized in aerospace applications. Various systems and methods are known in the art for forming a preform into a shaped body.

SUMMARY

According to various embodiments of the present disclosure, a manufacturing method is provided. The method includes arranging a preform over a surface of an inner mold line; folding the preform over sides of the inner mold line; pressing an end of the preform into a grip strip coupled to a side of the inner mold line; and translating the grip strip in a first direction to tension the preform into a shaped body.

In various embodiments, the grip strip is respectively coupled to a floating plate and wherein the floating plate is coupled to the inner mold line. In various embodiments, the floating plate is coupled to a tensioning system through the side of the inner mold line.

In various embodiments, the tensioning system is a gear rack-based tensioning system. In various embodiments, the gear rack-based tensioning system includes a gear rack and a tensioning mechanism, wherein threads on a gear of the tensioning mechanism interact with threads on the gear rack to translate the gear rack in a translation direction. In various embodiments, the tensioning mechanism includes a threaded stud knob, an inner thread standoff, a ball bearing assembly, the gear, and an outer standoff, wherein: the threaded stud knob applies a rotary action to the gear, the inner thread standoff provides spacing between the threaded stud knob and the gear, the inner thread standoff includes a slot on an outside diameter of the inner thread standoff, the ball bearing assembly holds the threaded stud knob and the gear in place with respect to the surface of the inner mold line, the outer standoff encompasses a portion of the inner thread standoff, and set screws in the outer standoff provide a mechanical stop by interfacing with the slot in the inner thread standoff once the preform is in a desired position.

In various embodiments, the tensioning system is a screw-based tensioning system. In various embodiments, the screw-based tensioning system includes a lead screw, a lead nut, and a tensioning mechanism, wherein threads on an outer surface of a gear of the tensioning mechanism interact with threads on an outer surface of the lead screw and wherein the threads on the outer surface of the lead screw interact with threads on an inner surface of the lead nut to translate the lead nut in a translation direction.

In various embodiments, the floating plate is coupled to the tensioning system through one or more pockets in the side of the inner mold line. In various embodiments, method further includes clamping the preform to the floating plate, wherein the clamping is provided by a self-supporting clamp that is coupled to a tensioning system. In various embodiments, the grip strip is coupled to the floating plate via an adhesion material. In various embodiments, the grip strip is two or more grip strips, wherein a first of the two or more grip strips is translated in the first direction at a first angle, wherein in a second of the two or more grip strips is translated in the first direction at a second angle, wherein the second angle is different than the first angle.

Also disclose herein is a system for forming a preform into a shaped body. The system includes: an inner mold line; and a grip strip coupled to a side of the inner mold line and configured to: receive an end of the preform; and translate in a first direction to tension the preform into the shaped body.

In various embodiments, the system further includes a floating plate, wherein the grip strip is coupled to the floating plate and wherein the floating plate is coupled to the inner mold line. In various embodiments, the system further includes a tensioning system, wherein the floating plate is coupled to the tensioning system through a side of the inner mold line.

In various embodiments, the tensioning system is a gear rack-based tensioning system. In various embodiments, the gear rack-based tensioning system includes a gear rack; and a tensioning mechanism, wherein threads on a gear of the tensioning mechanism interact with threads on the gear rack to translate the gear rack in a translation direction. In various embodiments, the tensioning mechanism includes a threaded stud knob; an inner thread standoff; a ball bearing assembly; the gear; and an outer standoff, wherein: the threaded stud knob applies a rotary action to the gear, the inner thread standoff provides spacing between the threaded stud knob and the gear, the inner thread standoff includes a slot on an outside diameter of the inner thread standoff, the ball bearing assembly holds the threaded stud knob and the gear in place with respect to a surface of the inner mold line, the outer standoff encompasses a portion of the inner thread standoff, and set screws in the outer standoff provide a mechanical stop by interfacing with the slot in the inner thread standoff once the preform is in a desired position.

In various embodiments, the tensioning system is a screw-based tensioning system. In various embodiments, the screw-based tensioning system includes a lead screw; a lead nut; and a tensioning mechanism, wherein threads on an outer surface of a gear of the tensioning mechanism interact with threads on an outer surface of the lead screw and wherein the threads on the outer surface of the lead screw interact with threads on an inner surface of the lead nut to translate the lead nut in a translation direction.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIGS. 8A and 8B illustrates a grip strip application process, in accordance with various embodiments.

DETAILED DESCRIPTION

Figure 1:
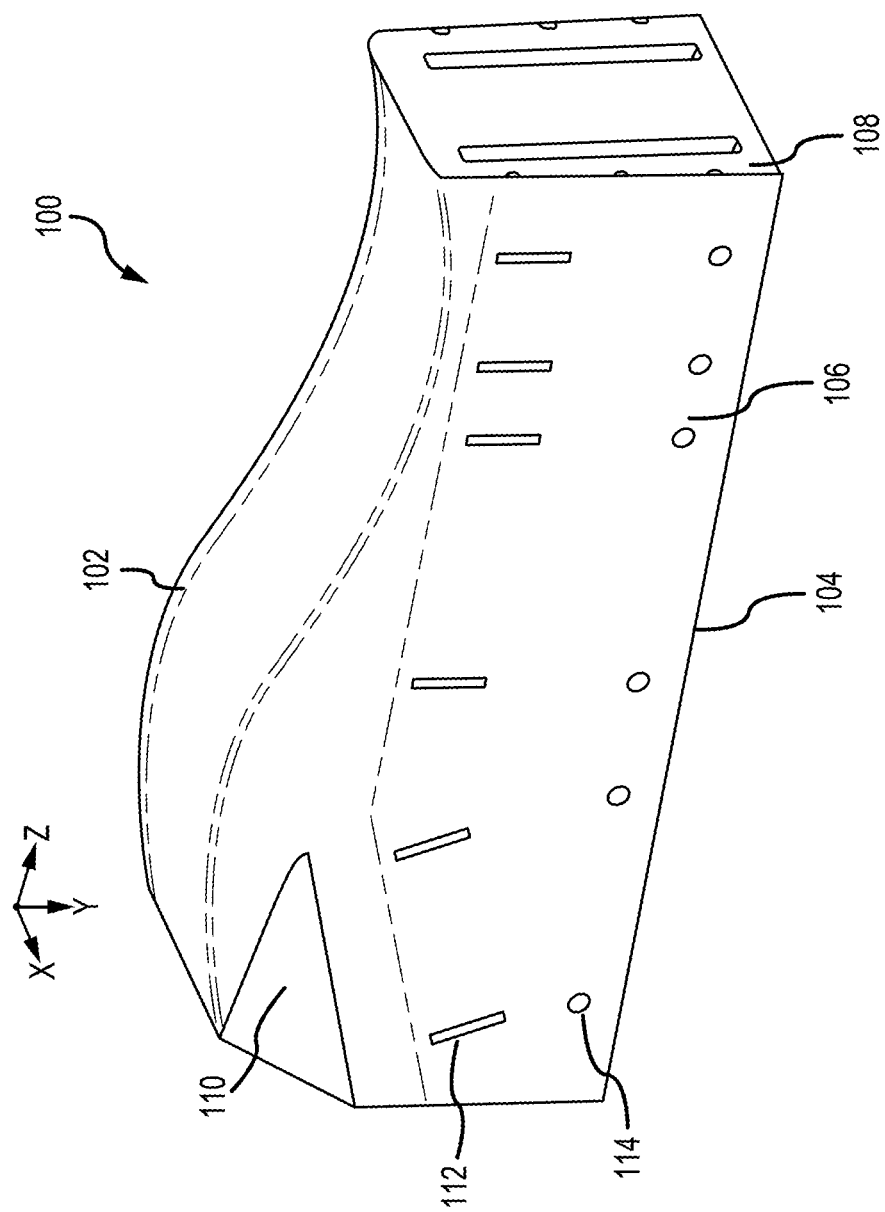
FIG. 1 illustrates an inner-mold line for use in forming a shaped body from a preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein are systems and methods for forming a preform into a shaped body. The systems and methods relate to complex geometry carbon preforms for C-C composites with curvatures along multiple planes. To properly form a shaped body, appropriate tension must be applied to the preform, such that the preform may be stretched around various corners and radii with little to no wrinkling or fiber kinking—important to achieve target mechanical properties and reproducibility. In various embodiments, the systems and methods disclosed herein, in various embodiments, apply even tension to the side wall edges of the preform. In various embodiments, the preform is coupled to floating grip plates, which are coupled to a male inner mold line (IML) tool. In various embodiments, the floating grip plates impart controlled translation along the IML, surface to regulate the tension or stretch on the side walls edges of a preform. In various embodiments, the floating grip plates include an adjustable tensioning system that sits underneath a surface of the IML. In various embodiments, the adjustable tensioning system is controlled by a knob/crank located outside of the tool. In various embodiments, grip strips may be bonded on top of the floating grip plates via adhesive tape or may be mechanically fastened to the grip plate. In various embodiments, the preform is pressed onto the grip strip and may be held onto the grip strips with self-supporting clamps or hooks, among others. In various embodiments, the preforms may then be compressed by vacuum-bagging (i.e., negative pressure) or using vacuum bagging and autoclave pressure (i.e., positive pressure). In various embodiments, the positive pressure on the preforms may be alternatively applied using flexible caul plates and pressurized bladders or using an actuated platen press, among others, to apply uniform pressure and compaction.

The disclosed systems and methods for forming a preform into a shaped body is an improvement over the current matched-die tooling for shape-forming, in various embodiments, by reducing or eliminating undesired wrinkling and kinking during part forming. The disclosed improvements to tooling and forming, in various embodiments, addresses the wrinkling and uneven compression issues seen in the match-die tooling approach. The utilization of floating grip plates provides an efficient, yet elegant, way to ensure even tension along the part, while utilizing best practices from current stretch/shape-forming procedures. In addition, the utilization of a plurality of floating grip plates provides an elegant mechanism for varying and precisely controlling the tensioning of the preform in different regions thereby allowing the preform to be formed into the desired shape while reducing or eliminating undesired wrinkling or kinking.

Referring now to FIG. 1, in accordance with various embodiments, an inner-mold line for use in forming a shaped body from a preform is illustrated. Inner-mold line (IML) 100 includes a top section 102, a bottom section 104, side sections 106, and a plurality of IML, stiffeners 108. In various embodiments, the outer portion of the top section 102, the bottom section 104, and the side sections 106 form an IML surface 110 for a given preform with given dimensions. In various embodiments, the side sections 106 may be substantially vertical. In various embodiments, the side sections 106 may be substantially parallel to the y-axis. In various embodiments, the side sections 106 may be substantially perpendicular to the x-axis. In various embodiments, the side sections 106 include a plurality of pockets 112 for one or more floating plates. In various embodiments, each of the plurality of pockets 112 are rectangular shaped slots that provide a clearance for a threaded connection, i.e., a screw and threaded standoff, between a floating plate on an outer portion of the IML 100 and an associated gear rack on an inner portion of the IML 100. In various embodiments, the side sections 106 further include a plurality of thru-holes 114 that provide access to a tensioning system from the outer portion of the IML 100 outside a compression mechanism area.

Figure 2:
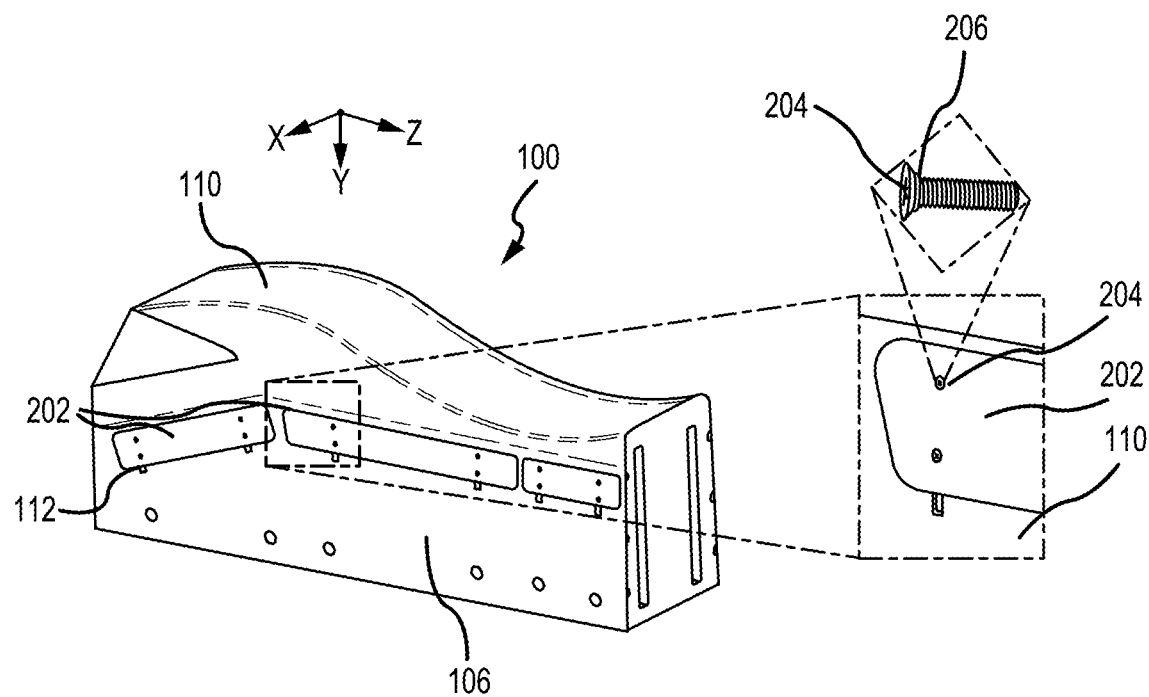
FIG. 2 illustrates a coupling of a plurality of floating plates to the IML, in accordance with various embodiments.

Turning to FIG. 2, in accordance with various embodiments, a coupling of a plurality of floating plates to the IML is illustrated. In various embodiments, a plurality of floating plates 202 outside the IML 100 of FIG. 1 may be coupled to a plurality of tensioning mechanisms inside the IML 100. In various embodiments, each floating plate in the plurality of floating plates 202 may traverse two of the plurality of pockets 112. In various embodiments, each floating plate in the plurality of floating plates 202 may be coupled to a respective tensioning mechanism via openings in each floating plate such that each floating plate is coupled using a set of screws 204, i.e., four screws, two screws per tensioning mechanism. While in the illustrated example, the floating plate is coupled using four screws, two for each tensioning mechanism, the various embodiments are not limited to the illustrated example. That is, in various embodiments, more or less screws may be utilized. For example, in various embodiments each floating plate in the plurality of floating plates 202 may be coupled to a respective tensioning mechanism via openings in each floating plate such that each floating plate is coupled using a set of screws, i.e., two screws, one screw per tensioning mechanism. As another example, in various embodiments each floating plate in the plurality of floating plates 202 may be coupled to a respective tensioning mechanism via openings in each floating plate such that each floating plate is coupled using a set of screws, i.e., six screws, three screws per tensioning mechanism. In various embodiments, the set of screws may be flat head screws with a tapered angle to the threads. In various embodiments, each screw 204 may have an O-ring slid over the threads and up to the head of the screw 204 along the tapered angle so that the O-ring engages with a respective opening in each floating plate providing an air-tight attachment.

Figure 3A:
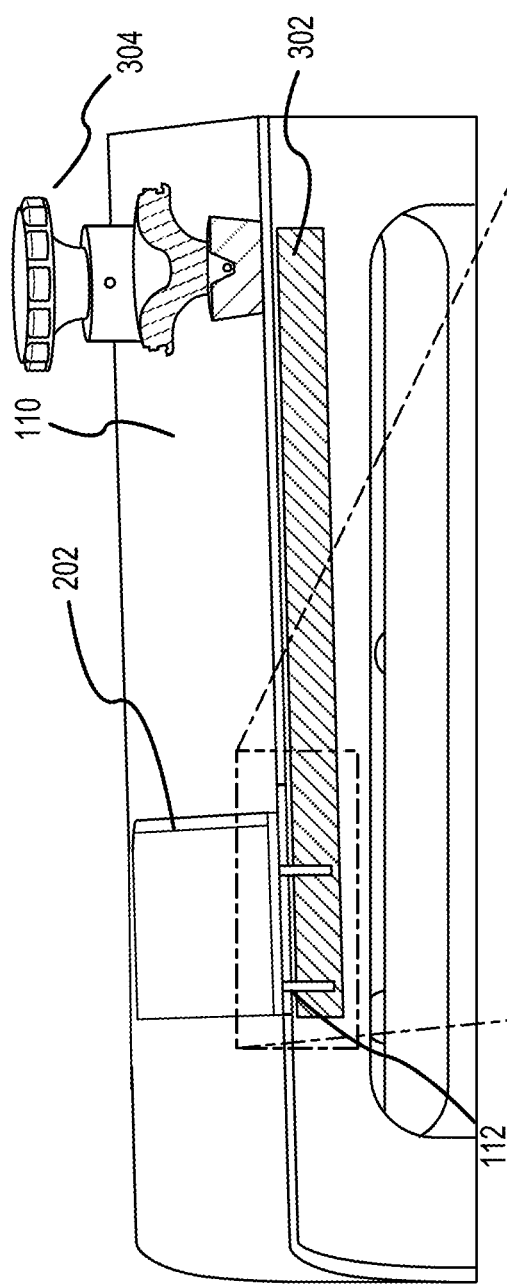
FIGS. 3A and 3B illustrates an isometric view of a gear rack-based tensioning system, in accordance with various embodiments.
Figure 3B:
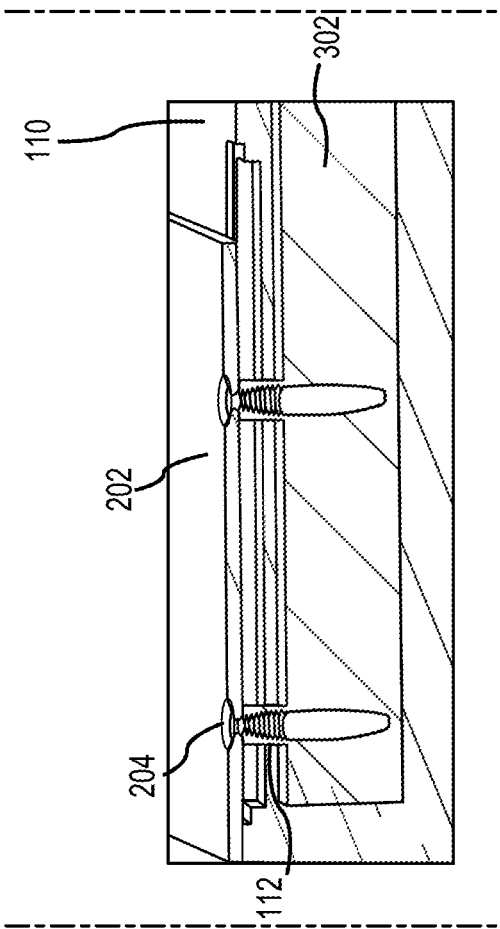

Turning to FIGS. 3A and 3B, in accordance with various embodiments, an isometric view of a gear rack-based tensioning system is illustrated. In the various embodiments, floating plate 202 is coupled to a first end of gear rack 302. In various embodiments, screws 204 are fed through the floating plate 202 and through a pocket of the pockets 112 such that the threads on an outer portion of the screws 204 engage with threads on an inner portion of openings on the first end of the gear rack 302. In various embodiments, the floating plate 202 is secured to the gear rack 302 such that the floating plate 202 is free to move in a translation direction along the IML, surface 110 of the side sections 106 of the IML 100. In that regard, the pockets 112 allow enough clearance for the floating plates 202 to slide in a first direction or slide in a second direction to tension and un-tension the preform. In various embodiments, a second end of the gear rack 302 is coupled to a tensioning mechanism 304, which is hereafter described in detail.

Figure 4A:
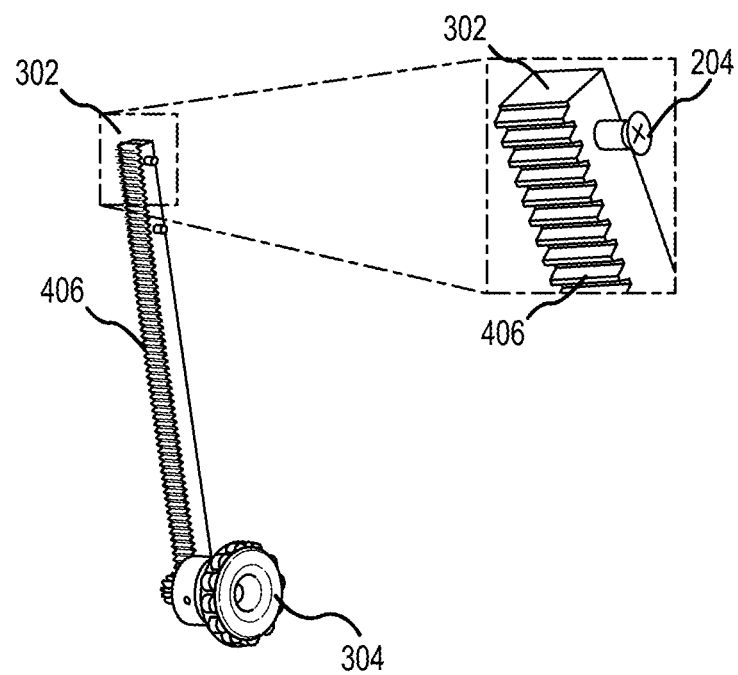
FIGS. 4A and 4B illustrates views of a gear rack, in accordance with various embodiments.
Figure 4B:
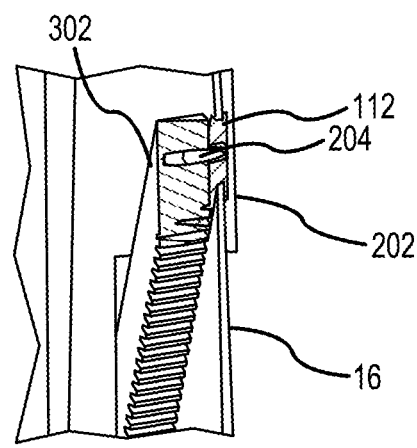

Turning to FIGS. 4A and 4B, in accordance with various embodiments, views of a gear rack, such as gear rack 303 of FIGS. 3A and 3B, is illustrated. In the various embodiments, of FIG. 4A, screw 204 has been inserted into a first end of the gear rack 302 up to a predefined length, with a portion of the screw 204 left extending from the gear rack to provide for the space of the floating plate and for the screw 204 to translate in a directed defined by the pocket in the IML. In various embodiments, a second end of the gear rack 302 is coupled to a tensioning mechanism 304, which is hereafter described in detail. In the various embodiments of FIG. 4B, a cross section along the length of a pocket of the pockets 112 in a side section of the side sections 106 is illustrated. In various embodiments, screws 204 are fed through the floating plate 202 and through a pocket of the pockets 112 such that the threads on an outer portion of the screws 204 engage with threads on an inner portion of openings on the first end of the gear rack 302. In various embodiments, the threads on an outer portion of the screws 204 engage with threads on an inner portion of openings on the first end of the gear rack 302. In various embodiments, the gear rack 302 includes threads 406 along one outer surface from the first end of the gear rack 302 to a second end of the gear rack 302. In various embodiments, the threads 406 mesh with threads on an outer surface of a gear of the tensioning mechanism 304.

Figure 5A:
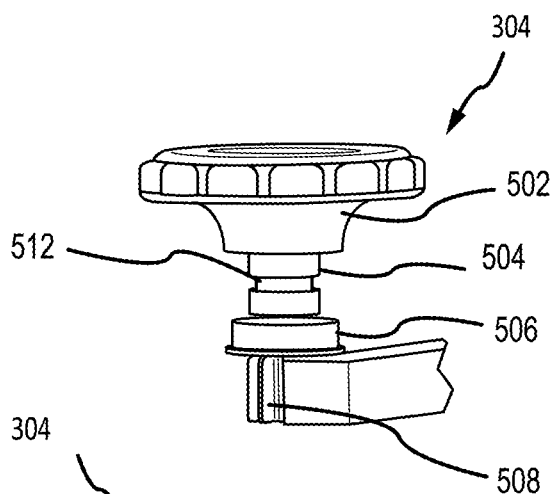
FIGS. 5A, 5B, and 5C illustrates a tensioning mechanism, in accordance with various embodiments.
Figure 5B:
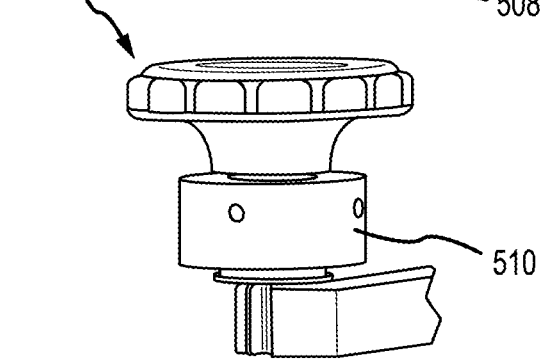
Figure 5C:
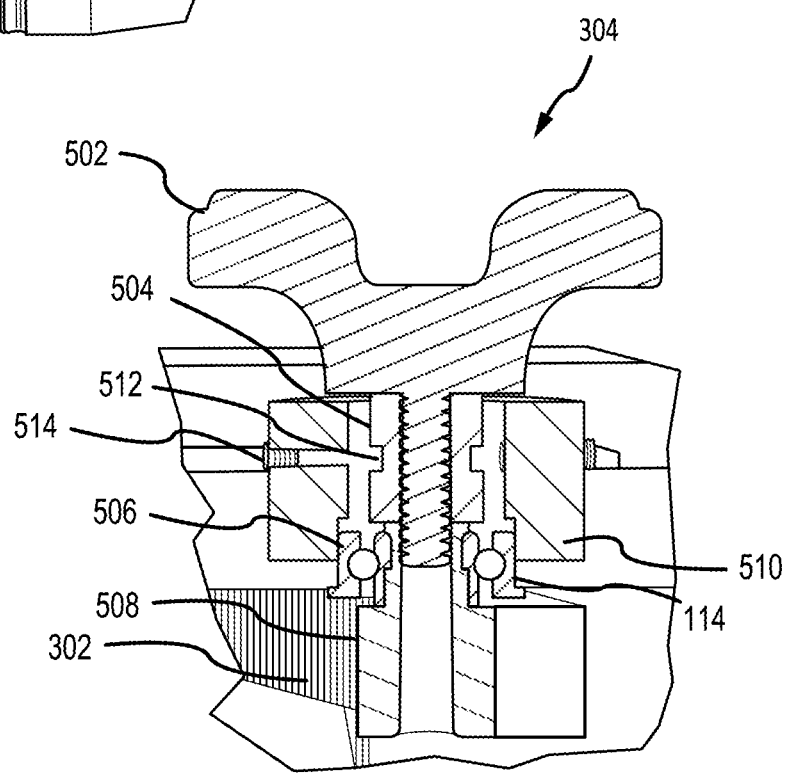

Turning to FIGS. 5A, 5B, and 5C, in accordance with various embodiments, a tensioning mechanism, such as tensioning mechanism 304 of FIGS. 3A and 3B, is illustrated. In various embodiments, FIG. 5C illustrates a cross section of the knob assemblies illustrated in FIGS. 5A and 5B. In the various embodiments, threads on a gear of the tensioning mechanism 304 mesh with the threads 406 on the gear rack 302 of FIGS. 4A and 4B. In various embodiments, the tensioning mechanism 304 includes a threaded stud knob 502, an inner thread standoff 504, a ball bearing assembly 506, a gear 508, and an outer standoff 510. In various embodiments, the threaded stud knob 502 may be utilized to apply rotary action to the gear 508. In various embodiments, the threaded stud knob 502 may be threaded into an inner portion of the inner thread standoff 504 and an inner portion of the gear 508. In various embodiments, the threaded stud knob 502 will be hand-turned to move the floating plate in a first direction or in a second direction to tension or un-tension the preform. In various embodiments, the inner thread standoff 504 provides spacing between the threaded stud knob 502 and the gear 508. In various embodiments, slot 512 on an outside diameter of the inner thread standoff 504 provides a part of mechanical stop in associated with the outer standoff 510, described in detail hereafter.

In various embodiments, the ball bearing assembly 506 holds the threaded stud knob 502 and the gear 508 assembly in place with respect to the IML, surface 110 of the IML 100. In various embodiments, the ball bearing assembly 506 may be press fit into against the inner tool surface. The OD of the gear shaft will be press fit into a thru-hole of the thru-holes 114 from an inside of the IML. In that regard, the ball bearing assembly 506 provides the stationary-rotary interface between the gear 508 and the threaded stud knob 502. In various embodiments, the gear 508, in response to rotation, translates the gear rack 302 of FIGS. 3A and 3B in a first direction in a second direction to tension or un-tension the preform. In various embodiments, the gear 508 may be threaded onto the end of the threaded stud knob 502 and press fit into the inner diameters of the ball bearing assembly 506. In various embodiments, the outer standoff 510 may encase a portion of the tensioning mechanism 304. In various embodiments, the outer standoff 510 encompasses a portion of the inner thread standoff 504 and a portion of the ball bearing assembly 506. In various embodiments, the outer standoff 510 may be press fit onto an outer surface of the ball bearing assembly, such that the outer standoff 510 is stationary. In various embodiments, set screws 514 in the outer standoff 510 may be tightened and loosened to interface with the slot 512 in the inner thread standoff 504 to lock the tensioning mechanism 304 from rotating. In that regard, set screws 514 in the outer standoff 510 may be tightened to provide a mechanical stop by interfacing with the slot 512 in the inner thread standoff 410 once the preform is in the desired position.

Figure 6A:
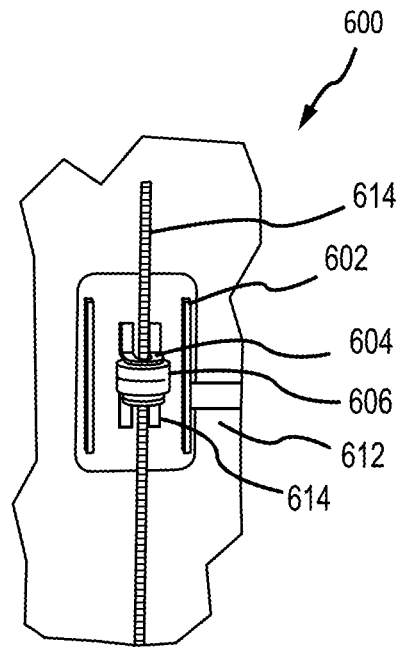
FIGS. 6A and 6B illustrates a screw-based tensioning system, in accordance with various embodiments.
Figure 6B:
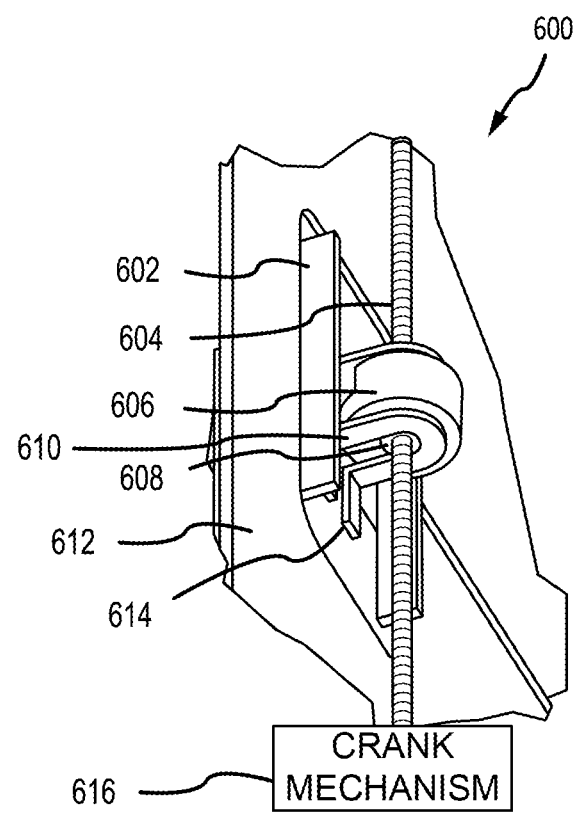

Turning to FIGS. 6A and 6B, in accordance with various embodiments, a screw-based tensioning system is illustrated. In various embodiments, the screw-based tensioning mechanism 600 includes grip plate guide rails 602, a lead screw 604, a collar assembly 606, a lead nut 608 in the collar assembly 606, and a bracket 610, which are positioned on an inside surface 612 of the IML, such as IML 100 of FIG. 1. In various embodiments, the grip plate guide rails 602 provide a guide in instances where the slot 112 of FIG. 1 may be wider than the screw, such as screw 204 of FIG. 2. In that regard, the grip plate guide rails 602 align the floating plates, floating plate 202 of FIG. 2, with the respective slot 112. In the various embodiments, the floating plate 202 may be coupled to an interface in the collar assembly 606. In that regard, the screw 204 may be fed through the floating plate 202 and through a pocket of the pockets 112 such that the threads on an outer portion of the screw 204 engage with threads on an inner portion of an opening within the collar assembly 606. In various embodiments, the threads on the outer surface of the lead screw 604 interfaces with threads on an inner surface of the lead nut 608 in the collar assembly 606. In various embodiments, interaction between the lead screw 604 and the lead nut 608 causes the lead nut to transition in a translation direction. In various embodiments, the collar assembly 606 is configured to be fixed within the bracket 610. In various embodiments, extensions 614 on the bracket 610 glide along the inside surface 612 of the IML. In that regard, bracket 610 reinforces the connection between the collar assembly 606 and the floating plate 202. In various embodiments, the bracket 610 may be fixed to the floating plate 202 to further reinforce the translating movement between the lead nut 608 and/or collar assembly 606 and the floating plate 202. In various embodiments, the lead screw 604 is fixed at both ends such that the lead screw 604 rotates when acted upon by a crank mechanism 616, such as hand crank, mechanical crank, or electrical crank, among others, that has a gearing mechanism with teeth that interfaces with the threads of the lead screw 604.

Figure 7:
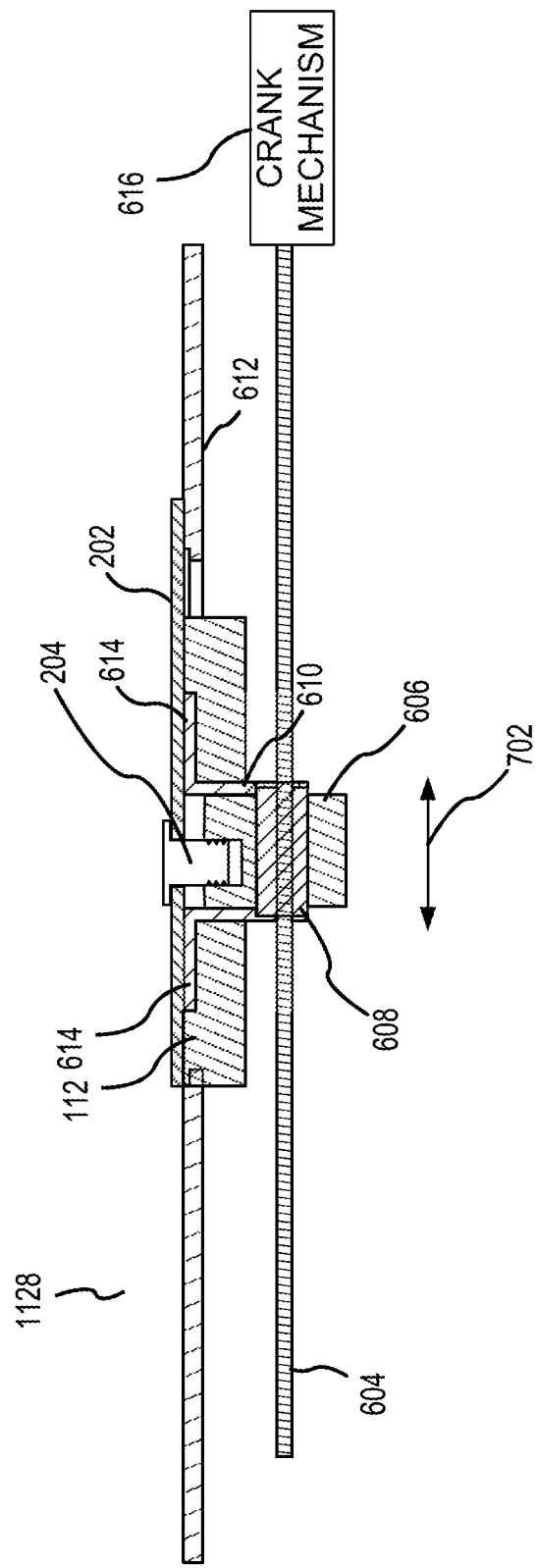
FIG. 7 illustrates a cross section of the screw-based tensioning system, in accordance with various embodiments.

Turning to FIG. 7, in accordance with various embodiments, a cross section of the screw-based tensioning system, such as screw-based tensioning mechanism 600 of FIGS. 6A and 6B, is illustrated. In various embodiments, the floating plate 202 of FIG. 2 is coupled to an interface in the collar assembly 606. In that regard, a screw, such as screw 204 of FIG. 2, is fed through the floating plate 202 and through a pocket of the pockets 112 such that the threads on an outer portion of the screw 204 engage with threads on an inner portion of an opening within the collar assembly 606. In various embodiments, the lead screw 604 interfaces with the lead nut 608 in the collar assembly 606. In various embodiments, interaction between the lead screw 604 and the lead nut 608 causes the lead nut to transition in a translation direction 702. In various embodiments, the collar assembly 606 is configured to be fixed within the bracket 610. In various embodiments, extensions 614 on the bracket 610 glide along the inside surface 612 of the IML. In that regard, bracket 610 reinforces the connection between the collar assembly 606 and the floating plate 202. In various embodiments, the bracket 610 may be fixed to the floating plate 202 to further reinforce the translating movement between the lead nut 608 and/or collar assembly 606 and the floating plate 202.

Figure 8B:
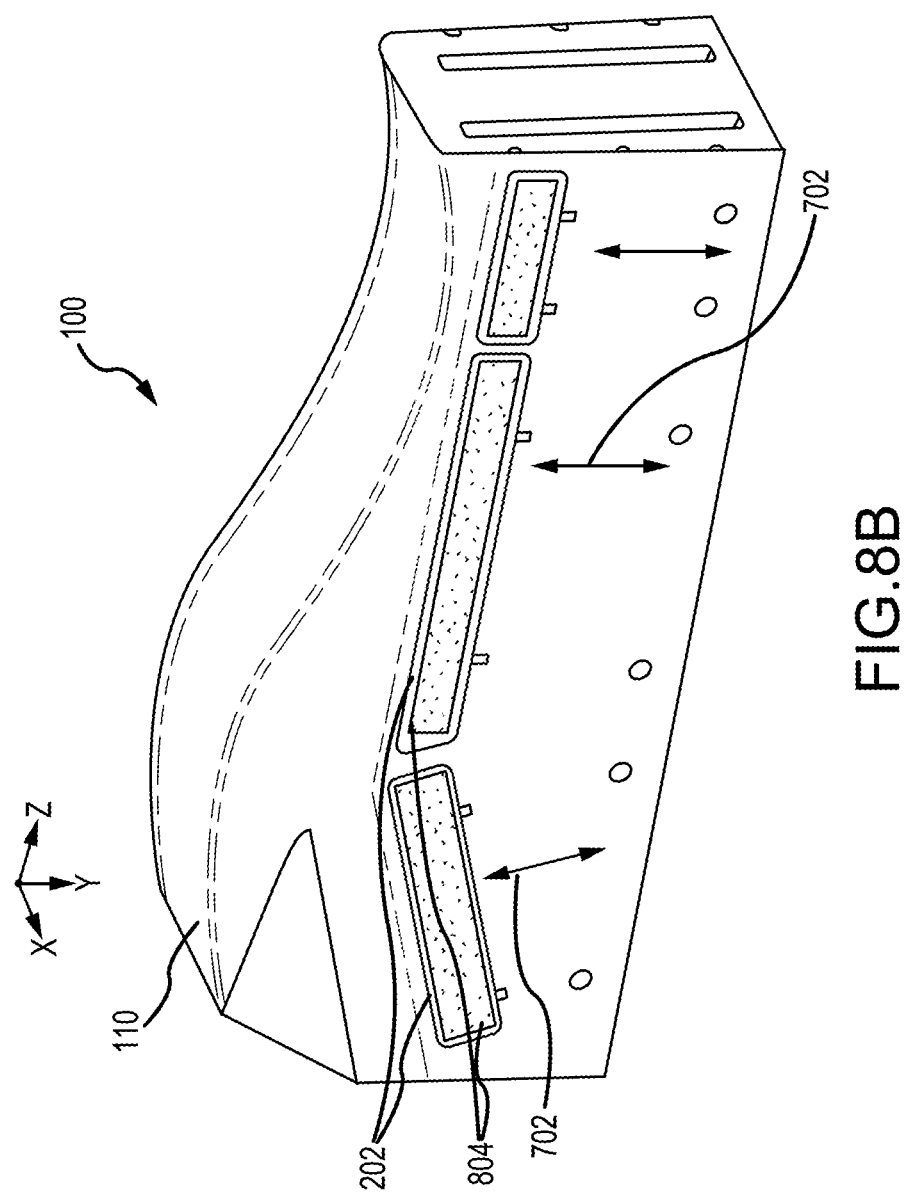

Turning to FIGS. 8A and 8B, in accordance with various embodiments, a grip strip application process is illustrated. In various embodiments, once the floating plates 202 are coupled to the IML surface 110 of the IML 100, an adhesion material 802 is applied to an outer surface of the floating plates 202, as illustrated in FIG. 8A. In various embodiments, the adhesion material 802 may be double-sided adhesive tape or glue, among others. In various embodiments, as illustrated in FIG. 8B, once the adhesion material 802 is applied, grip strips 804 are applied to the adhesion material 802. In various embodiments, the adhesion material 802 bonds the grip strips 804 to the floating plates 202. In various embodiments, rather than using the adhesion material 802, the grip strips 804 may be bonded to the floating plates 202 through mechanical methods, such as by using screws. In various embodiments, the grip strips 804 provide gripping mechanisms to grip the preform, such as pins angled downward, sharp teeth, or hooks, among others. In various embodiments, the gripping mechanism provide for pulling the preform as tension is applied via the described tensioning mechanisms. In various embodiments, a first angle of translation 702a is not the same as a second angle of translation 702b.

Figure 9:
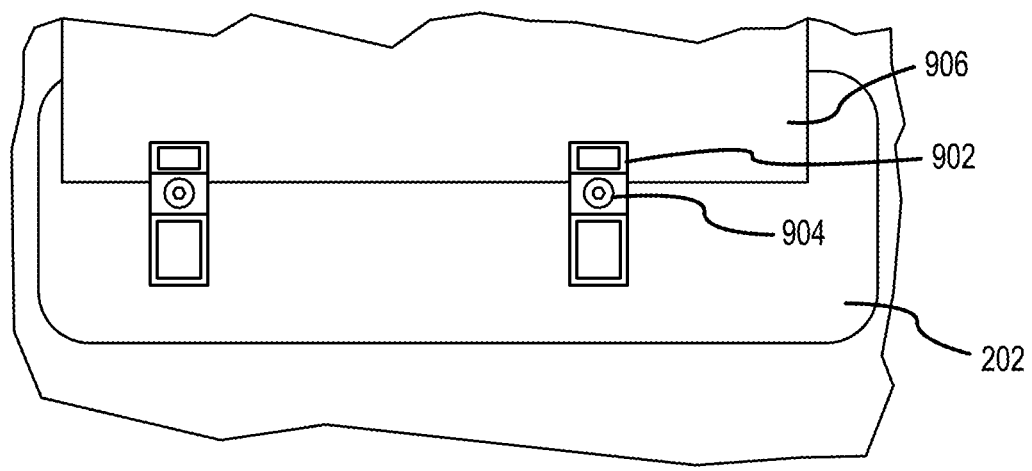
FIG. 9 illustrates a clamping mechanism, in accordance with various embodiments.

Turing now to FIG. 9, in accordance with various embodiments, a clamping mechanism is illustrated. In various embodiments, self-supporting clamps 902 may be attached to the floating plate 202. In various embodiments, the self-supporting clamps 902 may be coupled to the floating plate via screws 904. In various embodiments, the self-supporting clamps 902 may be coupled to one of the above-described tensioning mechanisms, such as by replacing screws 204 of FIG. 2 with a longer screw fed through the floating plate 202 and through a pocket of the pockets 112 of FIG. 2 such that the threads on an outer portion of the screws 204 engage, for example, with threads on an inner portion of openings on the first end of the gear rack 302 of FIGS. 3A and 3B or with threads on an inner portion of an opening within the collar assembly 606 of FIGS. 6A and 6B. In various embodiments, self-supporting clamps 902 clamps onto the preform board 906. In various embodiments, self-supporting clamps 902 may be used in conjunction with grip strips 804 of FIGS. 8A and 8B. In that regard, the self-supporting clamps 902 provide a clamping force to hold the preform board 906 to the grip strips 804.

Figure 10:
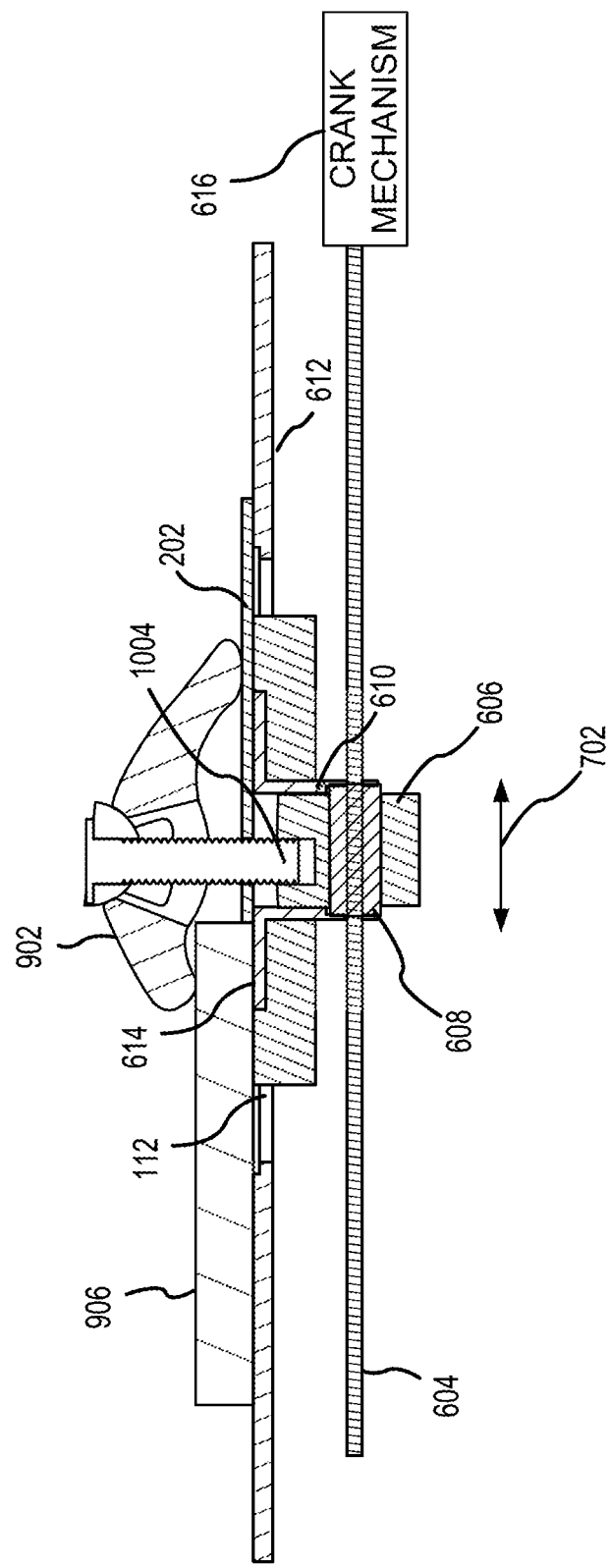
FIG. 10 illustrates a cross section of the screw-based tensioning system utilizing self-supporting clamps, in accordance with various embodiments.

Turning to FIG. 10, in accordance with various embodiments, a cross section of the screw-based tensioning system, such as screw-based tensioning mechanism 600 of FIGS. 6A and 6B, utilizing self-supporting clamps, such as self-supporting clamps 902 of FIG. 9, is illustrated. In various embodiments, a self-supporting clamp, such as self-supporting clamps 902 of FIG. 9, is coupled to the collar assembly 606 via the floating plate 202 of FIG. 2. In that regard, a screw 1004 is fed through an opening in the self-supporting clamps 902, through an opening in the floating plate 202, and through a pocket of the pockets 112 such that the threads on an outer portion of the screw 1004 engage with threads on an inner portion of an opening within the collar assembly 606. In various embodiments, the lead screw 604 interfaces with the lead nut 608 in the collar assembly 606. In various embodiments, interaction between the lead screw 604 and the lead nut 608 causes the lead nut to transition in a translation direction 702. In various embodiments, the collar assembly 606 is configured to be fixed within the bracket 610. In various embodiments, extensions 614 on the bracket 610 glide along the inside surface 612 of the IML. In that regard, bracket 610 reinforces the connection between the collar assembly 606 and the floating plate 202. In various embodiments, the bracket 610 may be fixed to the floating plate 202 to further reinforce the translating movement between the lead nut 608 and/or collar assembly 606 and the floating plate 202. In that regard, the self-supporting clamps 902 provide a clamping force to hold the preform board 906.

Figure 11:
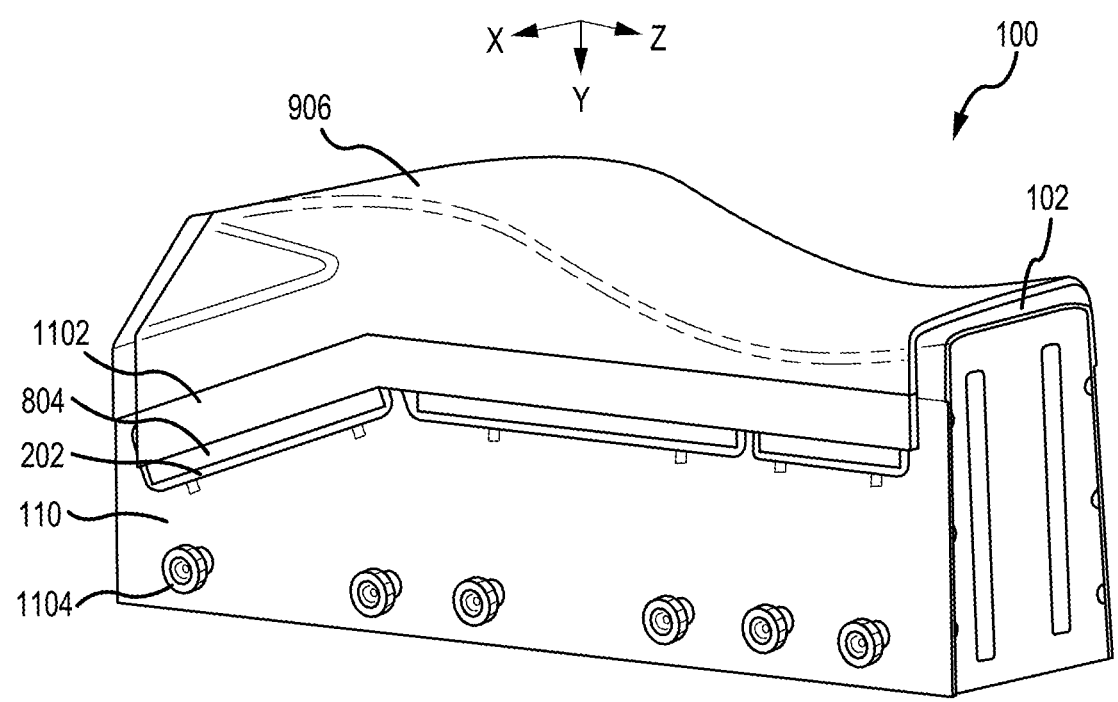
FIG. 11 illustrates tensioning of a preform over an inner-mold line utilizing tensioning systems, in accordance with various embodiments.

Turning to FIG. 11, in accordance with various embodiments, tensioning of a preform over an inner-mold line utilizing tensioning systems is illustrated. In various embodiments, the preform board 906 of FIG. 9 is laid over the top section 102 of the IML 100 of FIG. 1. The preform board 906 is then folded over the top section 102, pressing the preform grip area 1102 at the end of the preform board 906 in contact the grip strips 804 on the floating plates 202 of FIG. 8. Once the preform grip area 1102 is in contact the grip strips 804, a tensioning system controls 1104, such as tensioning mechanism 304 of FIG. 3 or crank mechanism 616 of FIG. 6, is utilized to tension the preform board 906 over the IML surface 110 of FIG. 1.

Figure 12:
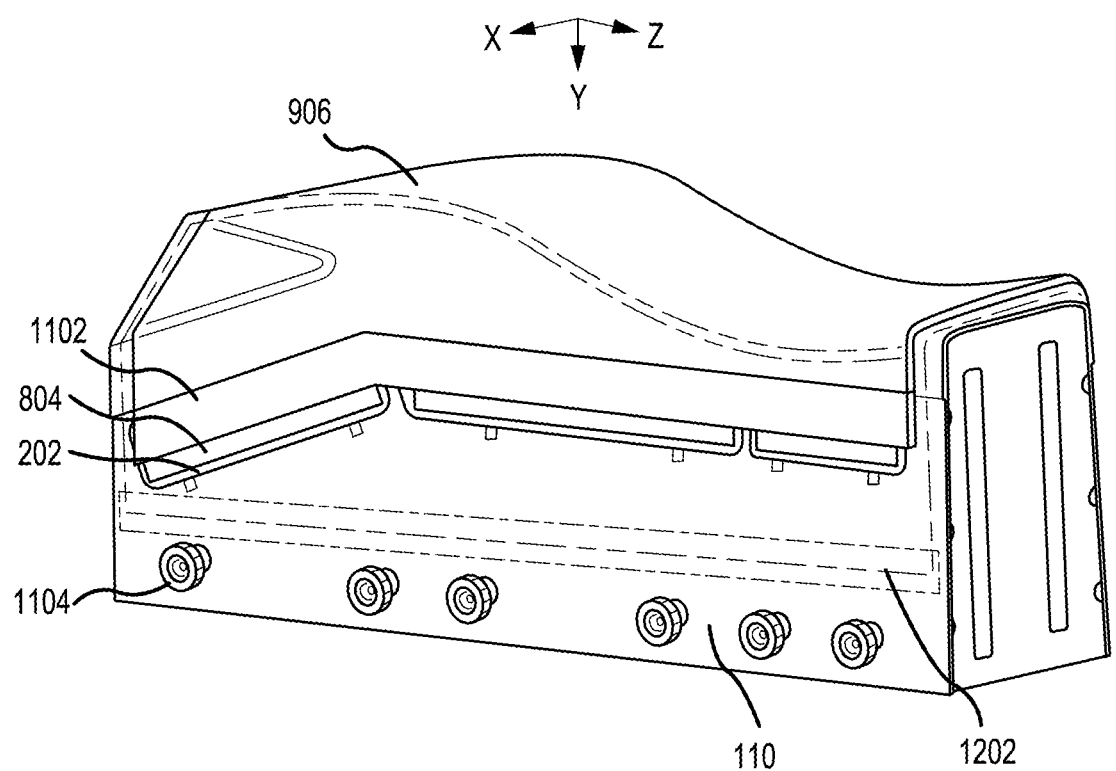
FIG. 12 illustrates a vacuum and/or bladder area, in accordance with various embodiments.

Turning to FIG. 12, in accordance with various embodiments, a vacuum and/or bladder area is illustrated. In various embodiments, the vacuum and/or bladder area 1202 is disposed around and outside the perimeter of the preform board 906 of FIG. 9, which is folded and tensioned around portions of the IML 100 of FIG. 1. In that regard, the vacuum and/or bladder area 1202 is such that the vacuum and/or bladder area 1202 encompasses the preform board 906 in its entirety as well as the grip strips 804 and floating plates 202 of FIG. 8. Also, in that regard, the vacuum and/or bladder area 1202 does not encompass the tensioning system controls 1104 of FIG. 11 so that the tensioning system controls 1104 may be easily accessed.

Figure 13:
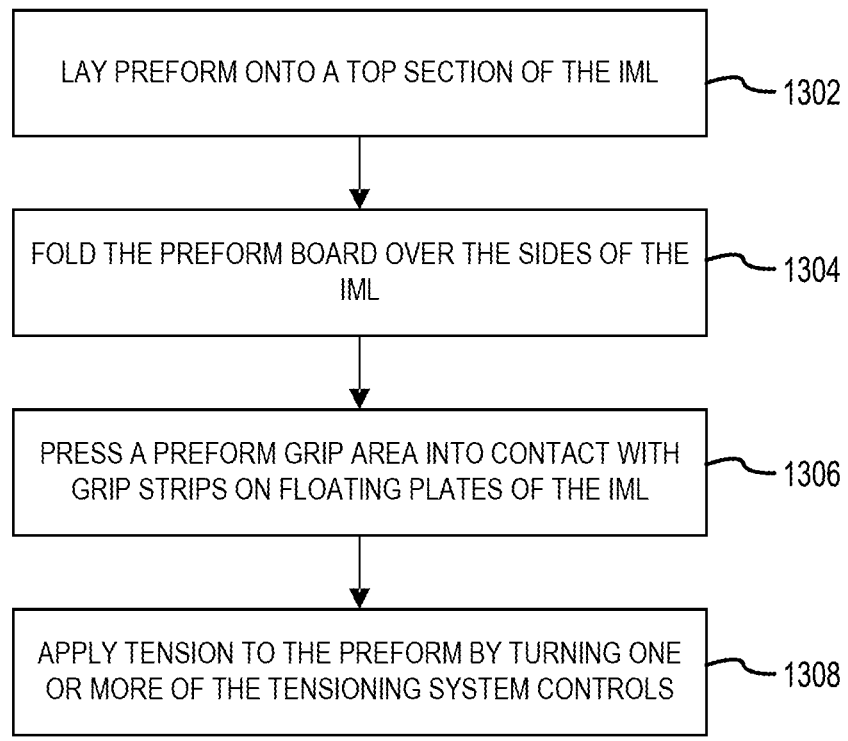
FIG. 13 illustrates a manufacturing method for forming a preform into a shaped body, in accordance with various embodiments.

Referring now to FIG. 13, in accordance with various embodiments, a manufacturing method for forming a preform into a shaped body is illustrated. For ease of description, the method 1300 is described with reference to FIGS. 1 thru 12. In step 1302, a preform board, such as preform board 906 of FIG. 9, is laid onto a top section of the IML, such as IML 100 of FIG. 1. At block 1304, the preform board is folded over the sides of the IML. At block 1306, a preform grip area, such as preform grip area 1102 of FIG. 11, is pressed into contact with grip strips on floating plates of the IML, such as the grip strips 804 on the floating plates 202 of FIG. 8. At block 1308, tension is applied to the preform by turning one or more of the tensioning system controls, such as the tensioning system controls 1104 of FIG. 11, to translate the floating plates thereby reducing or eliminating undesired wrinkling and kinking in the preform during part forming and forming the shaped body.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A manufacturing method, comprising:
    arranging a preform over a top surface of an inner mold line, wherein the inner mold line comprises the top surface and at least two side sections on opposing sides of the inner mold line relative to the top surface, wherein the inner mold line comprises a plurality of pockets in each of the at least two side sections, wherein a first floating plate of a plurality of floating plates is coupled to a first tensioning system through at least two first pockets of the plurality of pockets in a first side section of the at least two side sections of the inner mold line, wherein a second floating plate of the plurality of floating plates is coupled to a second tensioning system through at least two second pockets of the plurality of pockets in a second side section of the at least two side sections of the inner mold line, wherein a first gear rack of the first tensioning system runs parallel to an inner surface of the first side section, and wherein a second gear rack of the second tensioning system operates parallel to an inner surface of the second side section;
    folding the preform over the at least two side sections of the inner mold line;

responsive to folding the preform over the at least two side sections of the inner mold line:

pressing an end of the preform into a grip strip, wherein the grip strip is coupled to a floating plate of the plurality of floating plates and wherein the grip strip includes at least one of pins angled downward with respect to the top surface of the inner mold line or sharp teeth; and translating at least one of the first floating plate or the second floating plate of the plurality of floating plates in a first direction substantially parallel to a respective side section of the at least two side sections and away from the top surface of the inner mold line to tension the preform into a shaped body.

2. The manufacturing method of claim 1, wherein the first tensioning system and the second tensions system are gear rack-based tensioning systems.

3. The manufacturing method of claim 2, wherein each of the gear rack-based tensioning systems comprises a respective gear rack and a respective tensioning mechanism, wherein threads on a gear of the respective tensioning mechanism interact with threads on a respective gear rack to translate the respective gear rack in a translation direction.

4. The manufacturing method of claim 3, wherein the respective tensioning mechanism comprises a threaded stud knob, an inner thread standoff, a ball bearing assembly, the gear, and an outer standoff, wherein:

the threaded stud knob applies a rotary action to the gear, the inner thread standoff provides spacing between the threaded stud knob and the gear, the inner thread standoff comprises a slot on an outside diameter of the inner thread standoff, the ball bearing assembly holds the threaded stud knob and the gear in place with respect to a surface of at least one side section of the at least two side sections of the inner mold line, the outer standoff encompasses a portion of the inner thread standoff, and set screws in the outer standoff provide a mechanical stop by interfacing with the slot in the inner thread standoff once the preform is in a desired position.

5. The manufacturing method of claim 1, further comprising:

clamping the preform to the floating plate, wherein the clamping is provided by a self-supporting clamp that is coupled to a tensioning system.

6. The manufacturing method of claim 1, wherein the grip strip is coupled to the floating plate via an adhesion material.

7. The manufacturing method of claim 1, wherein the grip strip is two or more grip strips, wherein a first grip strip of the two or more grip strips is coupled to the first floating plate of the plurality of floating plates, wherein the first floating plate is translated in the first direction at a first angle, wherein in a second grip strip of the two or more grip strips is coupled to the second floating plate of the plurality of floating plates, wherein the second floating plate is translated in the first direction at a second angle, and wherein the second angle is different than the first angle.

* * * * *